I. OSGOOD.
Securing Hubs to Axles.
No. 59,445.  Patented Nov 6, 1866.
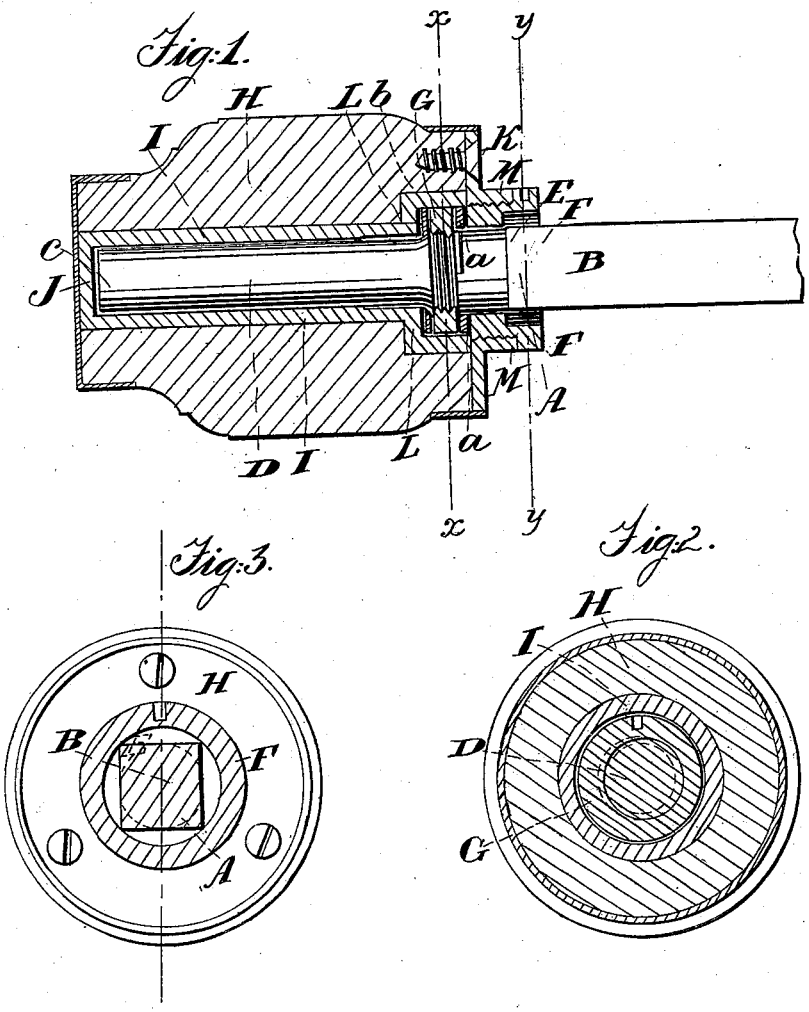

UNITED STATES PATENT OFFICE.

ISAAC OSGOOD, OF UTICA, NEW YORK.

IMPROVEMENT IN THE MODE OF SECURING WHEEL-HUBS TO AXLES.

Specification forming part of Letters Patent No. 59,445, dated November 6, 1866.

*To all whom it may concern:*

Be it known that I, ISAAC OSGOOD, of Utica, in the county of Oneida and State of New York, have invented a new and Improved Mode of Attaching Wheel-Hubs to their Axle-Shafts; and I do hereby declare that the following is a full, clear, and exact description thereof, which will enable others skilled in the art to make and use the same, reference being had to the accompanying drawings, forming a part of this specification.

In the present improvements the wheel-hub is secured at its inner end to the arm of the axle on which it turns by means of a screw-nut turning loosely in and between a fixed shoulder and detachable screw-collar of the said arm, against the outer face of which collar the hub, by a shoulder near the inner end of its bore, is brought to bear by screwing into such end of the hub the loose screw-nut of the axle-arm, thus firmly fastening or holding the hub to its axle, and in such a manner that it can be easily and readily detached or removed at pleasure.

In accompanying plate of drawings my invention is illustrated, Figure 1 being a central vertical section taken through the hub of the wheel, with the axle-arm shown in side elevation; Fig. 2, a transverse section taken in the plane of the line $x\,x$, Fig. 1; and Fig. 3, a similar section to Fig. 2, but taken in the plane of the line $y\,y$, Fig. 1.

Similar letters of reference indicate like parts.

A in the drawings represents the axle, made square at B, but round from the outer end C of the axle-arm D to its inner end, forming a square shoulder, E; F, a screw-nut, turning loosely on inner portion of axle-arm D, between its shoulder E and the shoulder formed by the collar G, when screwed upon the axle-arm at $g$ outside of its loose nut F, a washer, $a$, being used between the two; H, the wheel-hub; I, its bore, closed at the outer end, J, but open at its inner end, K, near which is formed a square shoulder, L. This hub H is placed upon the axle-arm D, as shown in Fig. 1, when, turning the loose nut F in the proper direction to screw into the screw-socket bushing M of the hub-bore, the hub is drawn on the axle-arm, and brought to a bearing by the shoulder L of its bore against the screw-collar G, (a washer, $b$, being used between them,) and thereby, as is obvious, secured to the axle-arm upon which it is to turn, the loose nut F turning in conjunction with it.

To remove the hub from its axle, it is only necessary to turn the loose nut in the proper direction to relieve the hub from its bearing against the screw-collar G, the nut being formed in any proper manner to receive a wrench or other suitable implement to turn it.

From the above description it is plain to be seen that by my improved mode of securing wheels to their axles many important advantages and an attachment both simple and effective in operation are obtained.

I claim as new and desire to secure by Letters Patent—

The arrangement of the nut F, screw-socket bushing M, collar G, and washers $a\,b$, in combination with the shouldered box I of the hub H, and shouldered axle A E, with the screw-thread $g$, constructed and operating in the manner and for the purpose herein represented and described.

ISAAC OSGOOD.

Witnesses:
M. M. LIVINGSTON,
ALBERT W. BROWN.